(12) United States Patent
Murphy

(10) Patent No.: US 10,041,442 B2
(45) Date of Patent: Aug. 7, 2018

(54) VARIABLE AREA FAN NOZZLE

(75) Inventor: Michael J. Murphy, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 1579 days.

(21) Appl. No.: 12/813,646

(22) Filed: Jun. 11, 2010

(65) Prior Publication Data

US 2011/0302907 A1   Dec. 15, 2011

(51) Int. Cl.
| | |
|---|---|
| F02C 1/00 | (2006.01) |
| F02K 1/06 | (2006.01) |
| F02K 1/08 | (2006.01) |
| F02K 1/15 | (2006.01) |
| F02K 3/06 | (2006.01) |

(52) U.S. Cl.
CPC .............. *F02K 1/06* (2013.01); *F02K 1/08* (2013.01); *F02K 1/15* (2013.01); *F02K 3/06* (2013.01)

(58) Field of Classification Search
CPC ..... F02K 1/06; F02K 1/08; F02K 1/09; F02K 1/15
USPC ......... 60/226.1, 226.2, 226.3, 262, 770, 771
See application file for complete search history.

(56) References Cited

U.S. PATENT DOCUMENTS

| | | | |
|---|---|---|---|
| 3,287,906 A | | 11/1966 | McCormick |
| 3,761,042 A | * | 9/1973 | Denning .................... 244/53 R |
| 3,814,324 A | * | 6/1974 | Wanger .................... F02K 1/12 239/127.3 |
| 3,841,091 A | * | 10/1974 | Sargisson et al. .............. 60/224 |
| 3,897,001 A | * | 7/1975 | Helmintoller et al. ....... 60/226.2 |
| 4,010,608 A | * | 3/1977 | Simmons ..................... 60/226.3 |
| 4,026,472 A | * | 5/1977 | Rabone ....................... 239/127.3 |
| 4,030,687 A | * | 6/1977 | Hapke .......................... 244/12.5 |
| 4,039,146 A | * | 8/1977 | Wagenknecht .......... 239/265.25 |
| 4,043,508 A | * | 8/1977 | Speir et al. .............. 239/265.19 |
| 4,050,242 A | * | 9/1977 | Dusa ................................ 60/204 |
| 4,064,692 A | * | 12/1977 | Johnson et al. ................ 60/762 |
| 4,072,008 A | * | 2/1978 | Kenworth et al. .............. 60/266 |
| 4,807,434 A | * | 2/1989 | Jurich .......................... 60/226.2 |
| 5,010,729 A | * | 4/1991 | Adamson et al. ........... 60/226.1 |
| 5,730,392 A | | 3/1998 | Lair |
| 5,915,917 A | | 6/1999 | Eveker et al. |
| 6,158,211 A | * | 12/2000 | Gonidec et al. ............ 60/226.2 |
| 6,523,339 B2 | | 2/2003 | Hubbard |

(Continued)

FOREIGN PATENT DOCUMENTS

| | | |
|---|---|---|
| EP | 0779429 | 6/1997 |
| EP | 1580419 | 9/2005 |

(Continued)

OTHER PUBLICATIONS

Extended EP Search Report, dated Jan. 20, 2012, EP Application No. 11169267.9.

(Continued)

*Primary Examiner* — Gerald L Sung
(74) *Attorney, Agent, or Firm* — Carlson, Gaskey & Olds, P.C.

(57) ABSTRACT

A nacelle assembly for a high-bypass gas turbine engine includes a variable area fan nozzle in communication with a fan bypass flow path. An actuator assembly is operable to move a second fan nacelle section relative to a first fan nacelle section to vary a fan nozzle exit area and adjust fan bypass airflow, the actuator assembly extends at least partially into the fan bypass flow path.

17 Claims, 5 Drawing Sheets

(56) References Cited

U.S. PATENT DOCUMENTS

| | | | |
|---|---|---|---|
| 7,051,982 B1* | 5/2006 | Johnson | 244/215 |
| 7,174,704 B2* | 2/2007 | Renggli | 60/204 |
| 7,216,474 B2 | 5/2007 | Bulman et al. | |
| 7,296,411 B2 | 11/2007 | Segota et al. | |
| 7,420,918 B2 | 9/2008 | Farahmand et al. | |
| 7,484,356 B1* | 2/2009 | Lair | 60/226.2 |
| 7,637,095 B2 | 12/2009 | Winter et al. | |
| 7,874,142 B2* | 1/2011 | Beardsley | 60/226.2 |
| 2002/0134070 A1* | 9/2002 | Orlando | F01D 9/041 60/204 |
| 2005/0007257 A1* | 1/2005 | Rast | B64D 47/04 340/815.45 |
| 2005/0204742 A1* | 9/2005 | Lair | 60/770 |
| 2007/0245739 A1* | 10/2007 | Stretton et al. | 60/728 |
| 2008/0006018 A1 | 1/2008 | Sheridan et al. | |
| 2008/0006021 A1* | 1/2008 | Schwarz | F02C 7/14 60/204 |
| 2008/0110152 A1* | 5/2008 | Kemper et al. | 60/226.1 |
| 2008/0302907 A1 | 12/2008 | Schafer | |
| 2009/0067993 A1* | 3/2009 | Roberge et al. | 415/145 |
| 2009/0094961 A1* | 4/2009 | Stern | 60/226.3 |
| 2009/0158704 A1 | 6/2009 | Whurr et al. | |
| 2010/0005778 A1 | 1/2010 | Chaudhry | |
| 2010/0059623 A1* | 3/2010 | Cazals et al. | 244/46 |
| 2010/0064659 A1 | 3/2010 | Wang | |
| 2010/0148396 A1 | 6/2010 | Xie et al. | |
| 2010/0331139 A1 | 12/2010 | McCune | |

FOREIGN PATENT DOCUMENTS

| | | |
|---|---|---|
| EP | 2138696 | 12/2009 |
| FR | 2906573 | 4/2008 |
| GB | 1516041 | 6/1978 |
| GB | 2041090 | 9/1980 |
| GB | 2444363 A | 6/2008 |
| WO | 200655217 | 5/2006 |
| WO | 2007038674 | 4/2007 |

OTHER PUBLICATIONS

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-1, 56-8, 60-1, 64-71, 87-9, 324-9, 436-7.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K, Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

(56) References Cited

OTHER PUBLICATIONS

Notice of Opposition to Patent No. EP 2420665. United Technologies Corporation opposed by Safran Aircraft Engines. dated Jul. 25, 2016.

Patentee's Request to Notice of Opposition to U.S. Pat. No. 2,420,665. United Technologies Corporation opposed by Safran Aircraft Engines. dated Jan. 12, 2017.

Naval Aviation Schools Command, Fundamentals of Aerodynamics, Prepared for Center for Naval Aviation Technical Training, Pensacola, FL, Apr. 2008, p. 1-229.

Finger, Steve, Transcript of Aero Club Speech given Sep. 25, 2008, Washington, DC, retrieved from http://www.pw.utc.com/Speeches/Story/20080925-1200/2008/A11%20Categories.

Holladay, April, Salt in your beer; a most streamlined shape, USA Today, Jan. 29, 2007.

* cited by examiner

VARIABLE AREA FAN NOZZLE

BACKGROUND

The present disclosure relates to a gas turbine engine, and more particularly to a turbofan engine having a variable area fan nozzle (VAFN).

Gas turbine engines which have an engine cycle modulated with a variable area fan nozzle (VAFN) provide a smaller fan exit nozzle during cruise conditions and a larger fan exit nozzle during take-off and landing conditions.

Often during re-engining studies one main goal is to package the largest possible fan onto a preexisting aircraft in order to maximize the fuel burn benefit. Additionally, as fan diameter grows and fan pressure ratio drops to achieve better fuel efficiency for a given thrust level, a VAFN is utilized to manage fan operability. The VAFN requires actuators which may limit the size of fan that can be installed onto a pre-existing aircraft.

SUMMARY

A nacelle assembly for a for a high-bypass gas turbine engine according to an exemplary aspect of the present disclosure includes a core nacelle defined about an engine centerline axis and a fan nacelle mounted at least partially around the core nacelle to define a fan bypass flow path. A variable area fan nozzle is in communication with the fan bypass flow path, and has a first fan nacelle section and a second fan nacelle section. An actuator assembly is operable to move the second fan nacelle section relative to the first fan nacelle section to vary a fan nozzle exit area and adjust fan bypass airflow, the actuator assembly extends at least partially into the fan bypass flow path.

A high-bypass gas turbine engine according to an exemplary aspect of the present disclosure includes a core engine defined about an axis. The core nacelle is defined at least partially about core engine and a fan nacelle mounted at least partially around the core nacelle to define a fan bypass flow path. A variable area fan nozzle is in communication with the fan bypass flow path, and has a first fan nacelle section and a second fan nacelle section. A multiple of actuator assemblies are operable to move the second fan nacelle section relative to the first fan nacelle section to vary a fan nozzle exit area and adjust fan bypass airflow, each of the multiple of actuator assemblies extends at least partially into the fan bypass flow path.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
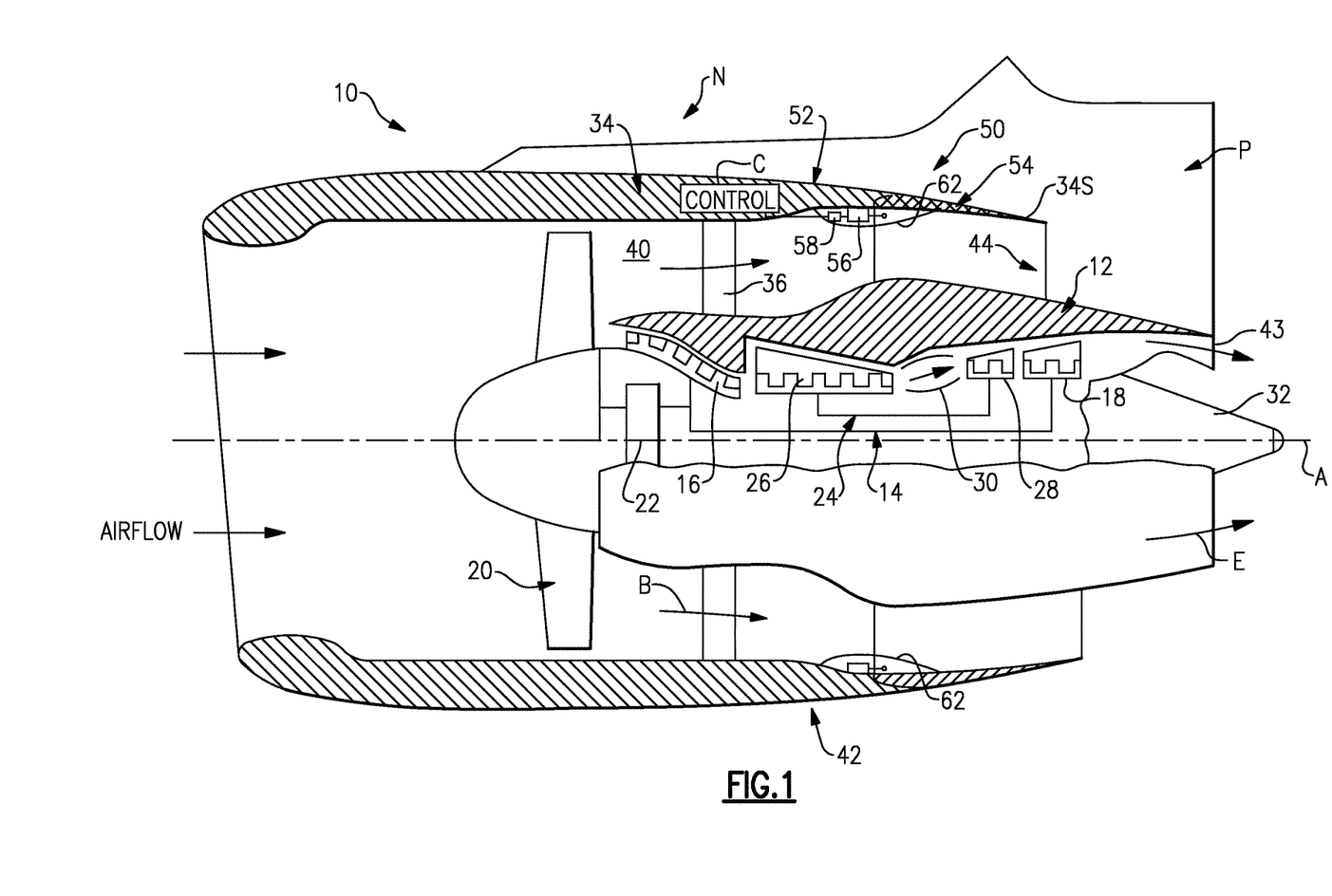
FIG. 1 is a general schematic partial fragmentary view of an exemplary gas turbine engine embodiment for use with the present invention.

FIG. 1 illustrates a general partial fragmentary schematic view of a gas turbofan engine 10 suspended from an engine pylon P within an engine nacelle assembly N. The turbofan engine 10 includes a core engine within a core nacelle 12 that houses a low spool 14 and high spool 24. The low spool 14 includes a low pressure compressor 16 and low pressure turbine 18. The low spool 14 also drives a fan section 20 directly or through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in one non-limiting embodiment is a high-bypass geared architecture aircraft engine, a turbofan diameter significantly larger than that of the low pressure compressor 16, and the low pressure turbine 18. The gear train 22 may be an epicycle gear train such as a planetary gear system or other gear system. It should be understood, however, that the above parameters are only exemplary of one non-limiting embodiment of a geared architecture engine and that this disclosure is applicable to other gas turbine engines including direct drive turbofans.

Airflow enters a fan nacelle 34 which at least partially surrounds the core nacelle 12. The fan section 20 communicates airflow into the core nacelle 12 and to the low pressure compressor 16 and the high pressure compressor 26. Core airflow compressed by the low pressure compressor 16 and the high pressure compressor 26 is mixed with the fuel in the combustor 30 and combusted. The resulting products are expanded over the high pressure turbine 28 and low pressure turbine 18. The turbines 28, 18 are coupled for rotation with respective spools 24, 14 to rotationally drive the compressors 26, 16 and through the gear train 22, the fan section 20 in response to the expansion. A core engine exhaust E exits the core nacelle 12 through a core nozzle 43 defined between the core nacelle 12 and a tail cone 32.

The core nacelle 12 is supported within the fan nacelle 34 by circumferentially spaced structures 36 often referred to as Fan Exit Guide Vanes (FEGVs). A bypass flow path 40 is defined between the core nacelle 12 and the fan nacelle 34. The bypass flow B communicates through the generally annular bypass flow path 40 and is discharged from the engine 10 through a variable area fan nozzle (VAFN) 42 which defines a nozzle exit area 44 between the fan nacelle 34 and the core nacelle 12 at a fan nacelle end segment 34S of the fan nacelle 34 downstream of the fan section 20.

Thrust is a function of density, velocity, and area. One or more of these parameters can be manipulated to vary the amount and direction of thrust provided by the bypass flow B. The VAFN 42 operates to effectively vary the area of the fan nozzle exit area 44 to selectively adjust the mass flow of the bypass flow B in response to a controller C. Low pressure ratio turbofans are desirable for their high propulsive efficiency. However, low pressure ratio fans may be inherently susceptible to fan stability/flutter problems at low flight speeds and some power setting combinations. The VAFN 42 allows the engine to change to a more favorable fan operating line at low power, avoiding the instability region and still provide the relatively smaller nozzle area necessary to obtain a high-efficiency fan operating line at cruise speeds.

The VAFN 42 does not affect the incidence angle of the fan section 20. It should be understood, however, that both fixed and variable pitch fan blades will benefit herefrom.

Figure 2:
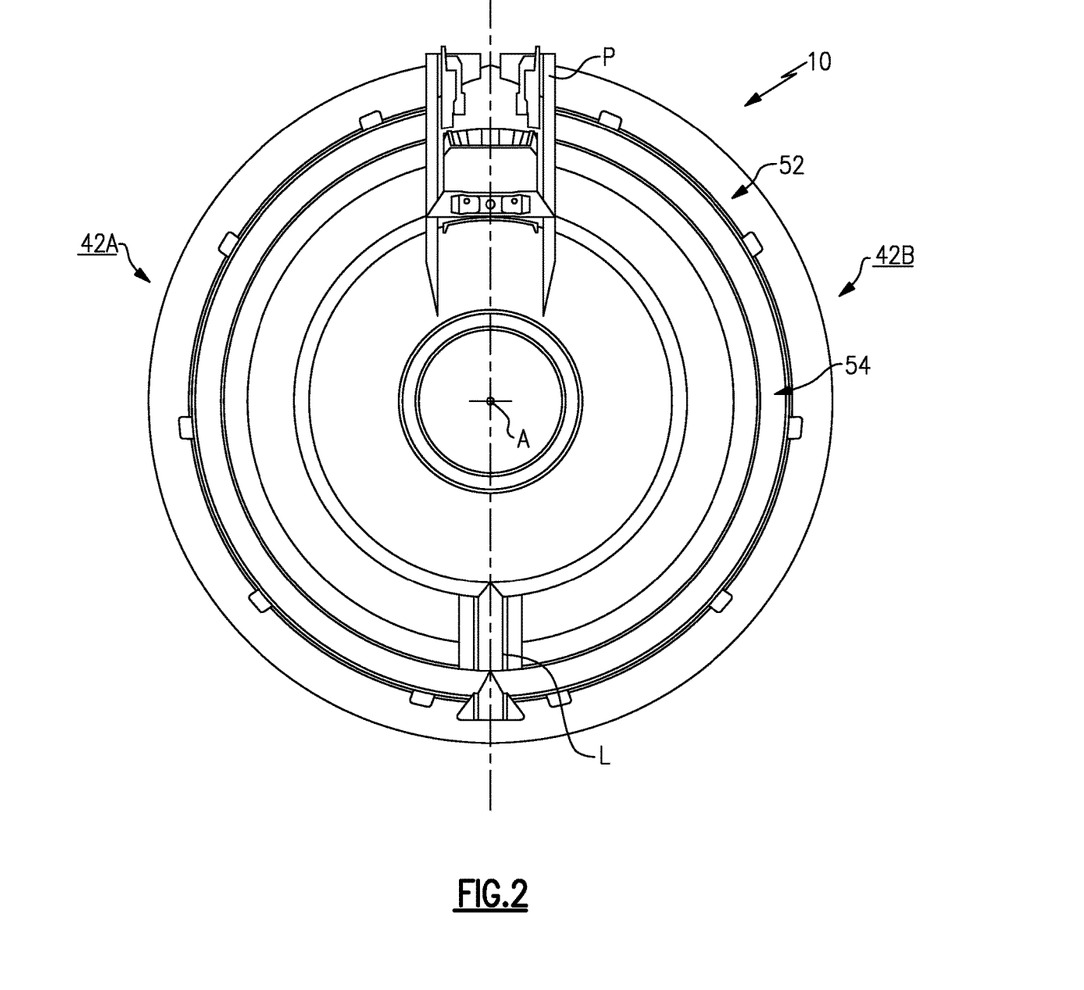
FIG. 2 is a rear view of the engine.

The VAFN 42 may be separated into at least two sectors 42A-42B (FIG. 2) defined between, for example, the pylon P and a lower bifurcation L which typically interconnects a larger diameter fan duct reverser cowl and a smaller diameter core cowl. It should be understood that although two segments are illustrated, any number of sectors may alternatively or additionally be provided.

Figure 3:
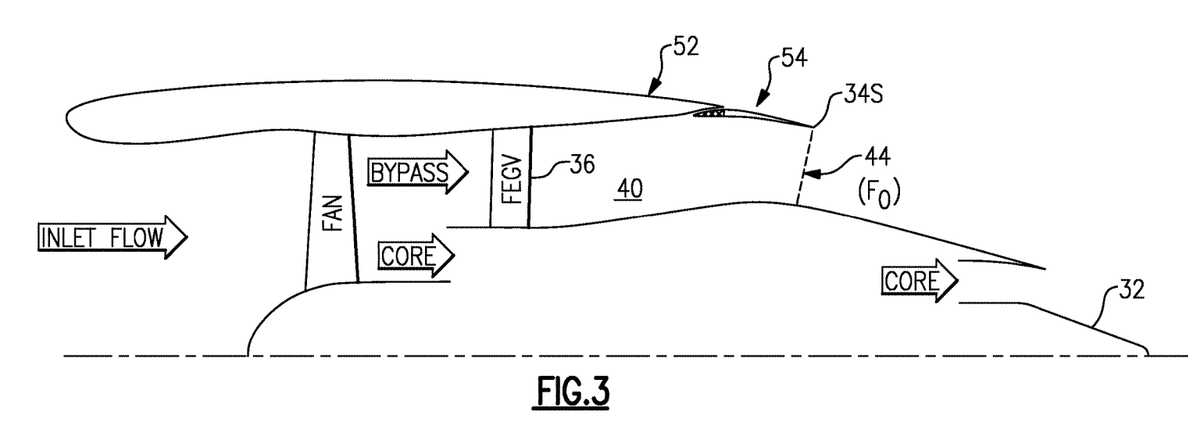
FIG. 3 is a schematic view of the engine with the VAFN in a closed position.
Figure 4:
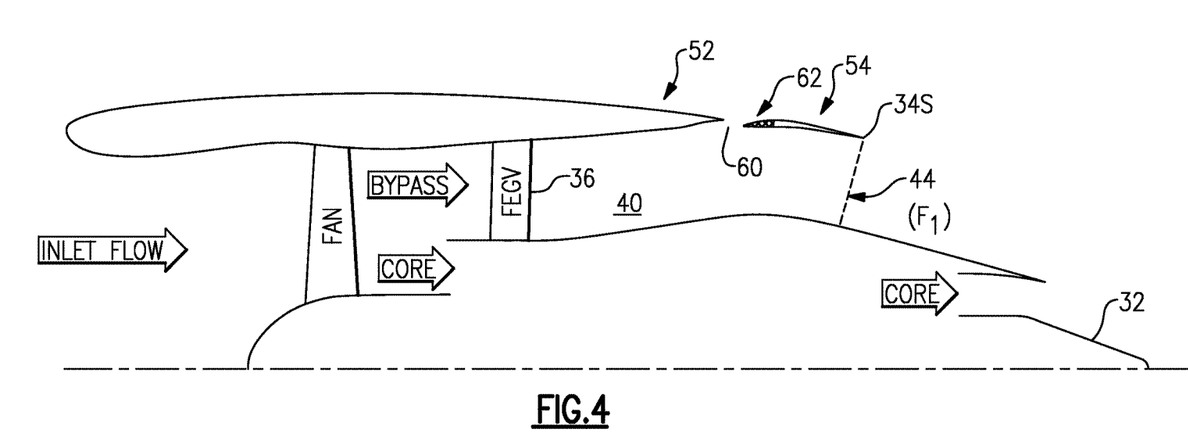
FIG. 4 is a schematic view of the engine with the VAFN in an open position.

The VAFN 42 selectively defines an auxiliary port system 50 having a first fan nacelle section 52 that include a thrust reverser cowl and a second fan nacelle section 54 that includes a VAFN cowl movably mounted relative the first fan nacelle section 52. The second fan nacelle section 54 axially slides along the engine axis A relative the fixed first fan nacelle section 52 to change the effective area of the fan nozzle exit area 44. That is, as the stroke of the second fan nacelle section 54 varies, the leading edge of the second fan nacelle section 54 is either covered by the first fan nacelle section 52 (FIGS. 3 and 4) or the leading edge is, at least partially uncovered to define an auxiliary port 60 (FIGS. 3 and 4).

The second fan nacelle section 54, in one non-limiting embodiment, moves along an actuator assembly 56 (FIGS. 5 and 6) within each sectors 42A-42B (FIG. 2) in response to a drive system 58 (FIG. 1). The actuator assembly 56 may include a slider tracker arrangement, worm gear, or other additional or alternative systems which provides relative movement between the second fan nacelle section 54 and the first fan nacelle section 52.

The VAFN 42 changes the physical area and geometry of the bypass flow path 40 during particular flight conditions. The bypass flow B is effectively altered by movement of the second fan nacelle section 54 relative the first fan nacelle section 52 between a closed position (FIG. 3) and an open position (FIG. 4). Movement of the second fan nacelle section 54 forward along the actuator assembly 56 toward the first fan nacelle section 52 closes the auxiliary port 60 between the second fan nacelle section 54 and the first fan nacelle section 52 to essentially provide a decrease in the fan nozzle exit area 44 toward exit area F0 (FIG. 3). Movement of the second fan nacelle section 54 aftward along the actuator assembly 56 away from the first fan nacelle section 52 opens the auxiliary port 60 between the second fan nacelle section 54 and the first fan nacelle section 52 to essentially provide an increased fan nozzle exit area 44 toward exit area F1 (FIG. 4). That is, exit area F1 with auxiliary port 60 (FIG. 4) is greater than exit area F0 (FIG. 3).

In operation, the VAFN 42 communicates with the controller C to move the second fan nacelle section 54 relative the first fan nacelle section 52 of the auxiliary port system 50 to effectively vary the area defined by the fan nozzle exit area 44. Various control systems including an engine controller or an aircraft flight control system may also be usable with the present invention. By adjusting the axial position of the entire periphery of the second fan nacelle section 54 in which all sectors are moved simultaneously, engine thrust and fuel economy are maximized during each flight regime by varying the fan nozzle exit area. By separately adjusting the sectors of the second fan nacelle section 54 to provide an asymmetrical fan nozzle exit area 44, engine bypass flow is selectively vectored to provide, for example only, trim balance, thrust controlled maneuvering, enhanced ground operations and short field performance.

Figure 5:
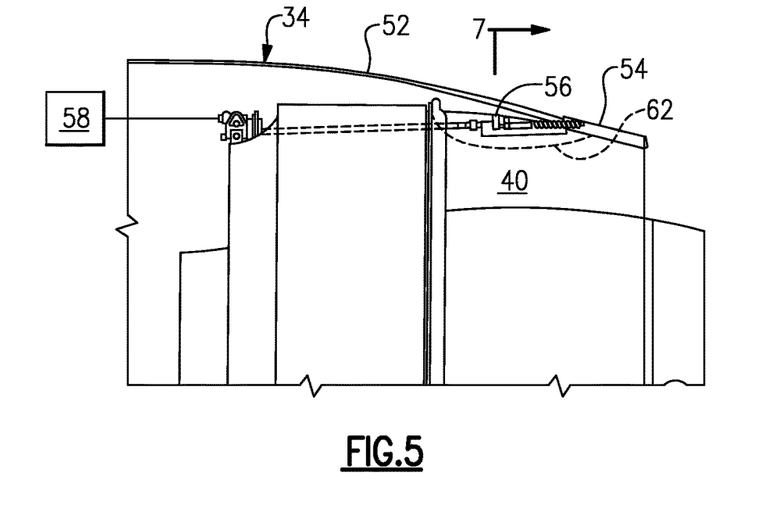
FIG. 5 is a partial phantom side view of the VAFN.
Figure 6:
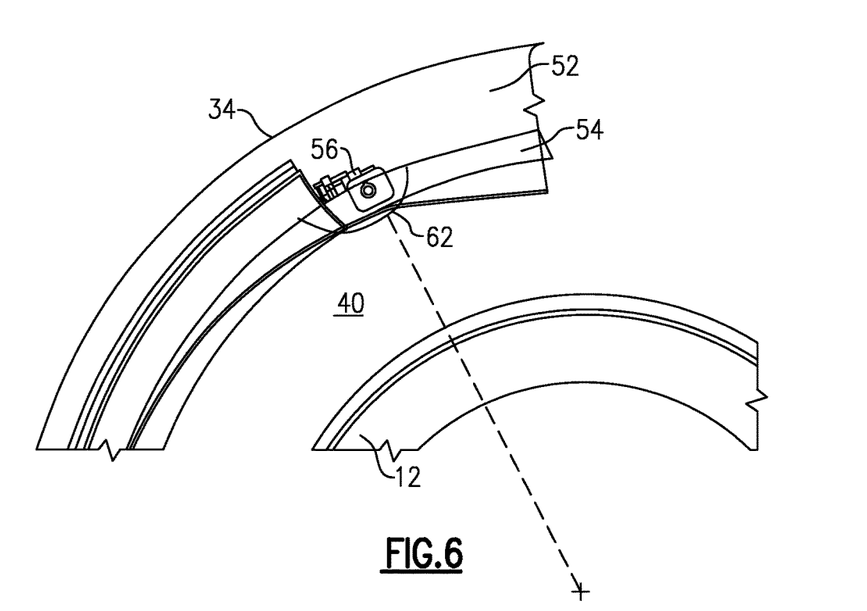
FIG. 6 is a partial phantom rear view of the VAFN.

Referring to FIGS. 5 and 6, the second fan nacelle section 54 is movable relative to the first fan nacelle section 52 with the actuator assembly 56. The actuator assemblies 56 are located within the first fan nacelle section 52 to reduce the amount of change in the basic nacelle outer contour to meet desired packaging requirements typical of a re-engining operation. It should be understood that any number of actuator assemblies 56 may be utilized herewith.

Figure 7:
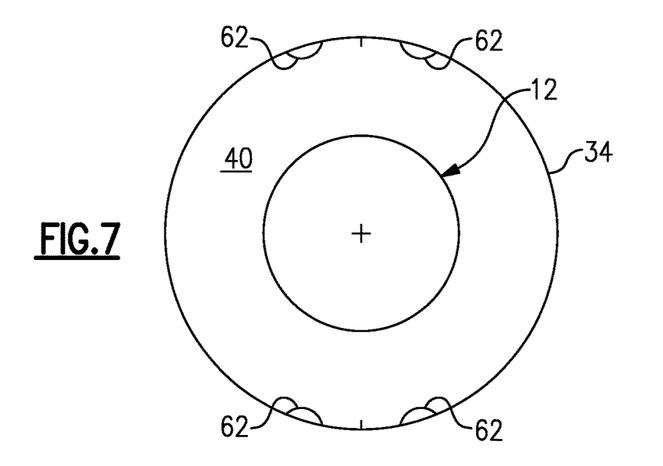
FIG. 7 is a schematic rear view of the VAFN.

Each actuator assembly 56 is located at least partially within the bypass flow path 40 of the fan nacelle 34. In one non-limiting embodiment, an actuator assembly 56 is distributed around the circumference position about the fan nacelle 34 inner diameter (FIG. 7). An actuator fairing 62 enclose the respective actuator assembly 56 (not shown) to maintain an aerodynamically acceptable bypass flow path 40. That is, each actuator fairing 62 extend from an inner diameter of the fan nacelle 34 and at least partially into the bypass flow path 40. In one non-limiting embodiment, each actuator fairing 62 is generally teardrop shaped. Essentially, each actuator assembly 56 is located within the bypass flow path 40, actuator fairings 62 are located over each actuator assembly 56 to provide and aerodynamically acceptable flow path, and the bypass flow path 40 is adjusted to maintain the desired fan nozzle exit area 44.

Figure 8:
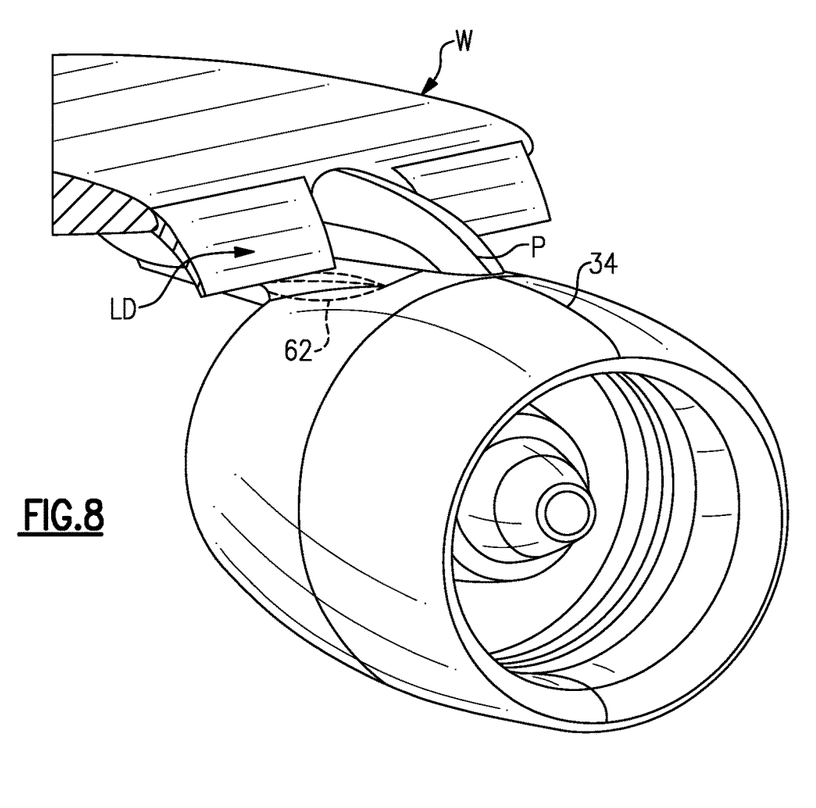
FIG. 8 is schematic perspective view of the VAFN relative a leading edge device.

In a re-engining operation, the space available between the wing and ground is fixed. The present disclosure thereby reduces the change in the basic nacelle outer contour to meet packaging requirements yet maximize fan diameter of a new engine such as a geared architecture engine onto a pre-existing aircraft. Furthermore, existing leading edge devices LD in close proximity to the nacelle 34 are thereby assured to not clash with the re-engined nacelle package to avoid any wing changes (FIG. 8).

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A nacelle assembly for a gas turbine engine comprising:
    a core nacelle defined about an engine centerline axis;
    a fan nacelle mounted at least partially around said core nacelle such that a fan bypass flow path is defined by an inner diameter of the fan nacelle and an outer diameter of the core nacelle, and wherein the fan bypass flow path is radially uninterrupted along at least a majority of the fan bypass flow path;
    a variable area fan nozzle in communication with said fan bypass flow path, said variable area fan nozzle having a first fan nacelle section and a second fan nacelle section; and an actuator assembly including an actuator operable to move said second fan nacelle section relative to said first fan nacelle section to vary a fan nozzle exit area and adjust fan bypass airflow, and a tear drop shaped actuator fairing enclosing said actuator, and said actuator assembly extends at least partially into said fan bypass flow path from a radially inward surface of said first fan nacelle section and a radially inward surface of said second fan nacelle section.

2. The nacelle assembly as recited in claim 1, wherein said actuator assembly extends radially inward toward said engine centerline axis.

3. The nacelle assembly as recited in claim 1, wherein said actuator fairing extends radially inward toward said engine centerline axis.

4. The nacelle assembly as recited in claim 1, wherein said second fan nacelle section is axially movable relative to said first fan nacelle section.

5. The nacelle assembly as recited in claim 4, wherein said second fan nacelle section defines a trailing edge of said first fan nacelle section.

6. The nacelle assembly as recited in claim 1, wherein said second fan nacelle section defines a trailing edge of said first fan nacelle section.

7. The nacelle assembly as recited in claim 1, further comprising an actuator fairing which encloses said actuator assembly, said actuator fairing extends radially inward toward said engine centerline axis.

8. The nacelle assembly as recited in claim 1, further comprising a fan within said fan nacelle, said fan driven by a core engine within said core nacelle.

9. The nacelle assembly as recited in claim 8, wherein said fan is driven by said core engine through a gear train.

10. The nacelle assembly as recited in claim 1, wherein said second fan nacelle section is movable relative to said first fan nacelle section between an open position and a closed position, said open position displaces said second fan nacelle section relative to said first fan nacelle section to define an auxiliary port through said fan nacelle between said second fan nacelle section and said first fan nacelle section, said closed position locates said second fan nacelle section adjacent to said first fan nacelle section to close said auxiliary port.

11. A gas turbine engine comprising:
a core engine defined about an axis;
a gear system driven by said core engine;
a fan driven by said gear system about said axis;
a core nacelle defined at least partially about said core engine;
a fan nacelle mounted at least partially around said core nacelle such that a fan bypass flow path is defined by an inner diameter of the fan nacelle and an outer diameter of the core nacelle;
a variable area fan nozzle in communication with said fan bypass flow path, said variable area fan nozzle having a first fan nacelle section and a second fan nacelle section; and
a multiple of actuator assemblies, each actuator assembly including an actuator operable to move said second fan nacelle section relative to said first fan nacelle section to vary a fan nozzle exit area and adjust fan bypass airflow and including a teardrop shaped actuator fairing at least partially enclosing the actuator, each of the multiple of actuator assemblies extends at least partially into said fan bypass flow path from a radially inward surface of said first fan nacelle section and a radially inward surface of said second fan nacelle section.

12. The gas turbine engine as recited in claim 11, wherein said multiple of actuator assemblies are distributed about an inner diameter of said fan nacelle.

13. The gas turbine engine as recited in claim 12, wherein said second fan nacelle section defines a first sector and a second sector.

14. The gas turbine engine as recited in claim 13, wherein each of said first sector and said second sector are defined between a pylon and a lower bifurcating splitter.

15. The gas turbine engine as recited in claim 11, wherein said second fan nacelle section is movable relative to said first fan nacelle section between an open position and a closed position, said open position displaces said second fan nacelle section relative to said first fan nacelle section to defines an auxiliary port through said fan nacelle between said second fan nacelle section and said first fan nacelle section, said closed position locates said second fan nacelle section adjacent to said first fan nacelle section to close said auxiliary port.

16. A nacelle assembly for a gas turbine engine comprising:
a variable area fan nozzle in communication with a fan bypass flow path, said variable area fan nozzle having a first fan nacelle section and a second fan nacelle section to vary a fan nozzle exit area and adjust a fan bypass airflow through said fan bypass flow path, said second fan nacelle section axially movable relative to said first fan nacelle section between an open position and a closed position, said open position displaces said second fan nacelle section relative to said first fan nacelle section to define an auxiliary port through said fan nacelle between said second fan nacelle section and said first fan nacelle section, said closed position locates said second fan nacelle section adjacent to said first fan nacelle section to close said auxiliary port;
an actuator assembly including an actuator operable to move said second fan nacelle section relative to said first fan nacelle section and including a teardrop shaped actuator fairing which encloses said actuator, said actuator fairing extends radially inward at least partially into said fan bypass flow path from a radially inward surface of said first fan nacelle section and a radially inward surface of said second fan nacelle section; and
wherein the fan bypass flow path is defined by an inner diameter of the fan nacelle and an outer diameter of a core nacelle.

17. The nacelle assembly as recited in claim 16, wherein said second fan nacelle section defines a trailing edge of said first fan nacelle section.

* * * * *